United States Patent [19]

Norwood et al.

[11] Patent Number: 4,628,185

[45] Date of Patent: Dec. 9, 1986

[54] TOASTER OVEN AND PROTECTIVE HOOD

[75] Inventors: Richard L. Norwood, Waterbury; Charles Z. Krasznai, Trumbull; Roman Czernik, Trumbull; Olle E. Haggstrom, Trumbull, all of Conn.

[73] Assignee: Black & Decker, Inc., Newark, Del.

[21] Appl. No.: 762,425

[22] Filed: Aug. 5, 1985

[51] Int. Cl.⁴ .......... H05B 3/06; A47F 5/08; F24C 7/00

[52] U.S. Cl. .......... 219/386; 219/521; 312/246; 312/333

[58] Field of Search .......... 219/385, 386, 400, 387, 219/521; 126/273 A, 275 E, 275 R, 19 M, 22, 37 B; 248/220.2, 201, 222.1, 222.2, 205.1; 312/246, 333

[56] References Cited

U.S. PATENT DOCUMENTS

| | | | |
|---|---|---|---|
| D. 266,137 | 9/1982 | Schmidli | 219/386 |
| 1,898,835 | 2/1933 | Henderson | 248/222.1 |
| 2,662,988 | 7/1948 | McKim | 310/91 |
| 2,889,442 | 6/1959 | Schultz | 219/398 |
| 2,944,540 | 7/1960 | Littell, Jr. | 126/273 |
| 3,021,185 | 2/1962 | Kowalczyk | 312/29 |
| 3,588,213 | 6/1971 | Braga | 312/214 |
| 3,698,780 | 10/1972 | Collins et al. | 312/245 |
| 3,752,551 | 8/1973 | Clark | 312/245 |
| 3,818,171 | 6/1974 | Miller et al. | 219/10.55 R |
| 3,859,901 | 1/1975 | White | 98/115 K |
| 4,011,803 | 3/1977 | Pfaffinger | 98/115 K |
| 4,084,702 | 4/1978 | Lucchitta | 211/88 |
| 4,094,485 | 6/1978 | O'Callaghan | 248/221.3 |
| 4,103,983 | 8/1978 | Morrison | 248/201 |
| 4,140,355 | 2/1979 | Swain | 312/330 R |
| 4,240,211 | 12/1980 | Keever, Jr. | 34/90 |
| 4,313,043 | 1/1982 | White et al. | 219/10.55 R |
| 4,327,274 | 4/1982 | White | 219/400 |
| 4,441,684 | 4/1984 | Credle, Jr. | 248/674 |
| 4,540,146 | 9/1985 | Basile | 248/201 |

FOREIGN PATENT DOCUMENTS 2042620  9/1980  United Kingdom .......... 248/201

OTHER PUBLICATIONS

Toastmaster Kitchen Dimensions Under the Cabinet Toaster Oven-Broiler Installation and Use Guide—Models 360 and 365—1984.

Primary Examiner—E. A. Goldberg
Assistant Examiner—Teresa J. Walberg
Attorney, Agent, or Firm—Paul J. Lerner

[57] ABSTRACT

An electric toaster oven wherein a unique protective hood and toaster oven construction are provided for supporting a toaster oven under a kitchen cabinet in such a manner that the kitchen cabinet is effectively protected from heat, steam and flames that could come from the toaster oven. Generally horizontal handles are integrally formed on plastic side walls of the toaster oven for cooperating with horizontal guide flanges that are provided on the protective hood for supporting and spacing the toaster oven from the hood.

7 Claims, 5 Drawing Figures

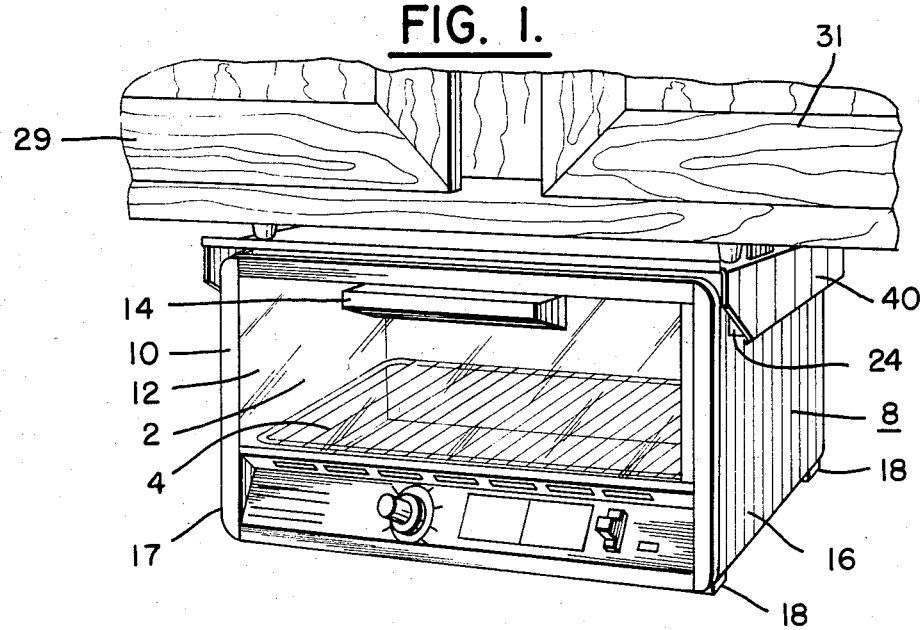
FIG. 1.
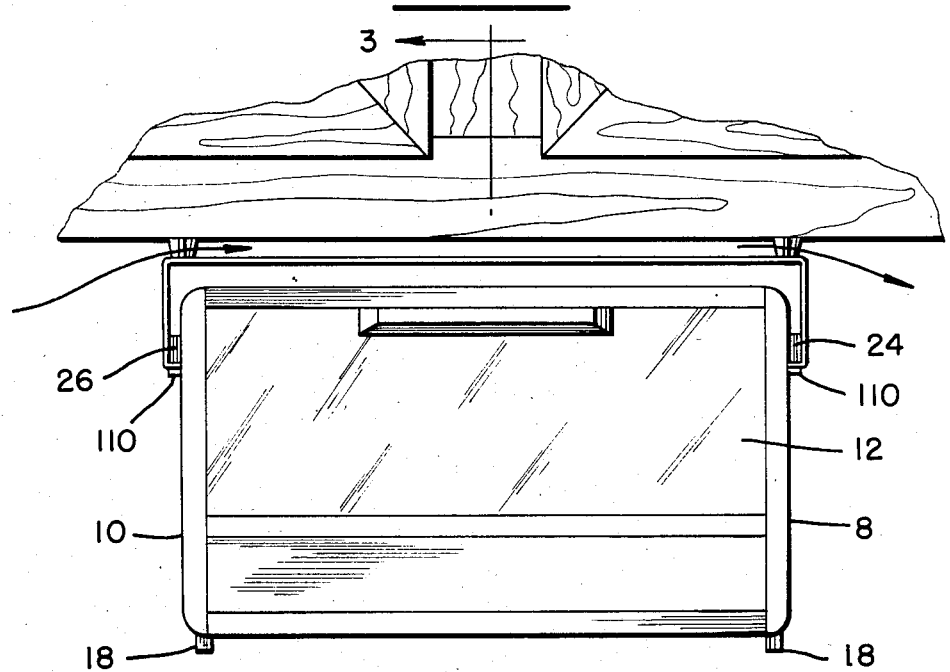
FIG. 2.
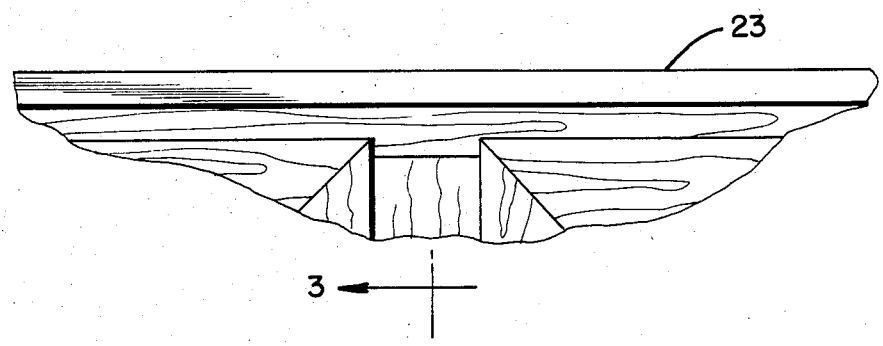

though such electric toaster ovens may be constructed, sub-assembled and assembled in a number of different ways, it is conventional to include two plastic side plates or shells 12 that are provided with outwardly extending generally horizontal handles for carrying the toaster oven from place to place. Feet have been provided on these side plates for supporting the toaster oven on a counter.

TOASTER OVEN AND PROTECTIVE HOOD

BACKGROUND OF THE INVENTION

1. Field of the Invention

This invention relates to an electric toaster oven and, more particularly, to an improved toaster oven and mounting hood whereby the toaster oven may be selectively suspended from a kitchen cabinet over and off the counter to save counter space, or used as a conventional toaster oven that is supported on the counter by feet that are provided on the toaster oven.

2. Description of the Prior Art

As shown in a prior U.S. Pat. No. 3,693,538, assigned to the same assignee as the present invention, electric toaster ovens have been supported on a table or a counter for toasting or cooking food. While such electric toaster ovens may be constructed, sub-assembled and assembled in a number of different ways, it is conventional to include two plastic side plates or shells 12 that are provided with outwardly extending generally horizontal handles for carrying the toaster oven from place to place. Feet have been provided on these side plates for supporting the toaster oven on a counter.

More recently, toaster ovens have been suspended directly under the kitchen cabinetry to provide additional counter space. When the toaster oven is supported underneath a wood cabinet, it is important that the cabinet be protected from heat, steam and flames that could come from the toaster oven.

Prior art hoods and mounting arrangements have been used for suspending a toaster oven under a wooden kitchen cabinet, however, they have been deficient in a number of respects. Most significantly, they sometimes do not adequately protect the wooden cabinet from the heat of the toaster oven. Moreover, at least one prior art toaster oven has been provided with slots in its upper horizontal wall, thereby, destroying the wall integrity of the toaster oven. Naturally, such slots also impair the appearance of the toaster oven should it be desired to use it in a conventional manner by placing it on a kitchen counter.

Our invention is concerned with such toaster oven constructions and mounting arrangements, and more particularly to an improved simplified mounting construction and hood which can be easily installed and adequately protects a cabinet from heat, steam and flames.

SUMMARY OF THE INVENTION

Accordingly, it is a particular object of our invention to provide an improved electric toaster oven and a protective hood for installing an electric toaster oven under a kitchen cabinet, which effectively protects the kitchen cabinet from heat, steam and flames that could come from the toaster oven.

It is also an object of our invention to provide an improved mounting arrangement which is simple and can be installed with conventional household tools.

It is a further object of our invention to provide an electric toaster oven and a protective hood for installing the toaster oven under a kitchen cabinet without impairing the appearance of the toaster oven, so that the toaster oven can be selectively removed from the hood and placed on a kitchen counter, if desired.

In accordance with the invention, an electric toaster oven is constructed to include a generally horizontal top wall, generally vertical side walls and a generally vertical rear wall. Conventionally, an opening is provided in a front wall to provide access to the inside of the toaster oven. Each of the side walls are formed to include a generally horizontal handle projection that is uniquely formed and positioned on the side wall in accordance with our invention. A protective hood is provided for mounting the toaster oven under a kitchen cabinet. The protective hood includes a generally horizontal top wall, an integrally formed depending rear wall and downwardly extending vertical side walls. Screws or other connecting means are attached to the top wall of the hood for suspending the hood under a wooden kitchen cabinet. Spacing means is also provided on the top wall of the hood for insuring that the hood is spaced from the kitchen cabinet to provide a cooling air flow over the top of the hood. An inwardly extending flange is formed on each of the vertical walls of the hood for slidable engagement with the horizontal handles of the toaster oven. The parts are constructed and positioned so that the distance from the bottom of the handle projections to the top wall of the toaster oven is approximately one-half inch less than the distance from the top of the inwardly directed flanges of the hood to the top horizontal wall of the hood. Thus, the top wall of the toaster oven is positioned at least one-half inch below the top wall of the hood to provide air flow between the top wall of the hood and the top wall of the toaster oven. Naturally, this air flow would be warmer than the air flow across the top of the hood. Each of the inwardly directed flanges are also provided with an upwardly extending portion at their rear ends for cooperating with the rear ends of the handles. Moreover, the rear ends of the handles and the upwardly extending portions of the flanges are uniquely positioned with respect to each other and to the hood and the toaster oven so that when the rear of the handles are moved into abutting relation with the upwardly extending portions of the inwardly extending flanges of the hood, the rear wall of the toaster oven will be positioned at least one-half inch forwardly from the rear wall of the hood. Thus, at least one-half inch of air space is provided between the rear wall of the hood and the rear wall of the toaster oven.

With this construction, we have found that sufficient air will flow upwardly between the rear wall of the toaster oven and the rear wall of the hood and then forwardly between the top wall of the hood and the top wall of the oven where it can be vented in front of the hood.

Moreover, with this construction the downwardly extending vertical walls of the hood wrap around the top portion of the toaster oven and the projecting handles so that very little, if any, hot air flows outwardly to the sides of the toaster oven and the hood where it could cause damage to a wooden cabinet. Essentially all of the hot air is vented forwardly between the hood and the top of the toaster oven. The hot air then flows upwardly in front of the cooler air that flows upwardly from between the cabinet and the top of the hood. Thus, the cooler air flowing from the top of the hood keeps the hot air away from the face of the cabinet.

In addition, with such a construction, the toaster oven may be readily suspended in the hood or removed from the hood. With the hood installed under the cabinet, it is merely necessary to lift the toaster oven and position the handles on the inwardly extending flanges and then slide the toaster oven rearwardly until the rear of the handles abut the upwardly extending portions of the flanges.

To remove the toaster oven from the hood, it is merely necessary to slightly lift the toaster oven and slide it forwardly on the inwardly extending flanges. Moreover, the toaster oven may then be simply placed on the counter with the lower portions of the vertical side walls of the toaster oven resting on the counter in a conventional manner. When operated in this conventional manner, the appearance of the toaster oven has not been impaired. The top horizontal wall is smooth without any slots or other connecting means attached to it and the side horizontal handles present a good conventional appearance.

In accordance with a further aspect of our invention, the outwardly extending handle projections of the toaster oven may be uniquely shaped for cooperating with a slot or aperture that may be formed in the inwardly directed flanges for locking the toaster oven in position on the hood. This may be achieved by simply integrally forming a downwardly extending triangular projection on each of the outwardly extending handles at the same time that the side panels are formed. A slot or aperture may be formed in the inwardly directed flanges of the hood at the same time that the flanges are being formed. With this construction, when the toaster oven is slid into position on the hood, when the rear portions of the handles abut the upwardly extending portions of the inwardly extending flanges the downwardly extending triangular locking projection of the handle may fall within the aperture or slot that is formed in the inwardly directed flanges to thereby lock the toaster oven into position on the hood.

BRIEF DESCRIPTION OF THE DRAWING

Other objects and attendant advantages of the invention will be apparent from the following description taken in connection with the accompanying drawing in which:

FIG. 1 is a front perspective view of our improved toaster oven and protective hood mounted under a kitchen cabinet;

FIG. 2 is a front elevational view of the toaster oven and protective hood shown in FIG. 1;

FIG. 5 is a fragmentary cross sectional view of our improved toaster oven handle and a guide and stop flange for the handle.

DESCRIPTION OF THE PREFERRED EMBODIMENT

Figure 3:
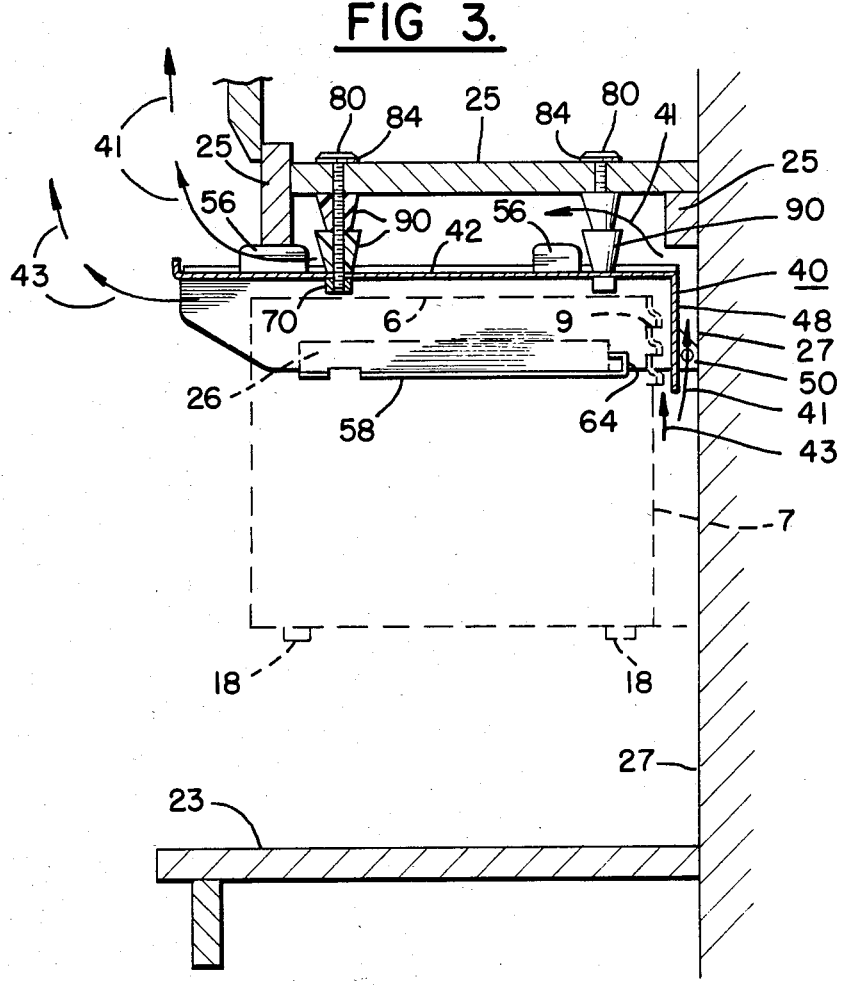
FIG. 3 is a cross-sectional view of the electric toaster oven and protective hood shown in FIG. 2 taken substantially on the plane of 3—3 of FIG. 2 with portions of the parts being shown in diagramatic form in order to illustrate the air flow patterns around our improved toaster oven and protective hood.

Referring now to the drawing and first particularly to FIGS. 1 and 3, there is shown an electric oven toaster which includes a toasting and oven chamber 2 in which is mounted a generally horizontal rack 4 for holding food to be cooked or toasted. The toaster oven includes a generally horizontal top wall 6, a rear wall 7, with air vents 9, generally parallel vertical side walls 8 and 10, and a front opening 12 to provide access to the inside of the toaster oven. Conventionally, a glass door 14 may be provided for closing the front opening.

The side walls 8 and 10 preferably include integrally molded plastic shells 16 and 17 which may be provided with feet 18 for supporting the oven toaster on a counter 23 in a conventional manner.

While prior art toaster ovens have included generally horizontal handles that have been integrally molded with the generally vertical plastic side shells, in accordance with our invention outwardly extending integrally molded handles 24 and 26 are uniquely formed and specifically located upwardly on the vertical side shells of the toaster oven for selectively suspending the electric toaster oven from our improved protective hood.

With particular reference to the FIG. 2 and FIG. 3, in accordance with our invention, a protective hood 40 is provided for suspending a toaster oven below a wooden kitchen cabinet 25 so that two cooling air streams are utilized for effectively protecting the wooden cabinet from heat, steam and flames that could come from the toaster oven. The hood includes a generally top horizontal wall 42, two generally vertical side walls 44 and 46 and a depending rear wall 48. The hood is positioned so that the horizontal top wall 42 is at least one-half inch below the lowermost portion of the wooden kitchen cabinet and the downwardly extending rear wall is at least three-eighths inch in front of the kitchen wall 27, on which the kitchen cabinet 25 is mounted. Moreover, as shown in the diagramatic view of FIG. 3, the generally horizontal top wall 42 of the hood extends forwardly at least three-eighths of an inch in front of the kitchen cabinet doors 29 and 31. In this way, at least a three-eights inch wide cooling air stream 41 is caused to flow upwardly from a kitchen countertop 23 between the kitchen wall 27, and the rear wall 48 of the hood. The air stream 41 continues as a one-half inch wide cooling air stream that is caused to flow forwardly between the top wall 42 of the hood, and the lower wooden portion of the kitchen cabinet 25. As shown, the cool air stream 41 continues to flow upwardly along the front doors of the kitchen cabinets.

As shown in the diagramatic view of FIG. 3, it can also be appreciated that the toaster oven is suspended from the hood so that the rear wall 7 of the toaster oven is at least one-half inch in front of the downwardly extending rear wall 48 of the hood, and the top wall 6 of the toaster oven is at least one-half inch below the top wall 42 of the hood. In this manner, a second warmer cooling air stream 43 is caused to flow upwardly along the rear wall 7 of the toaster oven in front of the rear wall 48 of the hood, and then forwardly across the top wall 6 of the toaster oven and below the top wall 42 of the hood. It can be appreciated that substantial heat will be imparted to this air stream 43 as it flows across the hot surfaces of the toaster oven walls and as it picks up heat from air vents 9. Thus, the heated air expands forcing the flow forward and upward as the air heats and the expansion causes it to accelerate. Airstream 43 removes heat from the area between the rear wall 7 of the toaster oven and the rear wall 40 of the hood, and the top wall 6 of the toaster oven and the top wall 42 of the hood. With this construction, the hot air from the toaster oven is vented forwardly in front of the generally cooler air stream 41 that is caused to flow along the front doors of the wooden cabinet.

Figure 4:
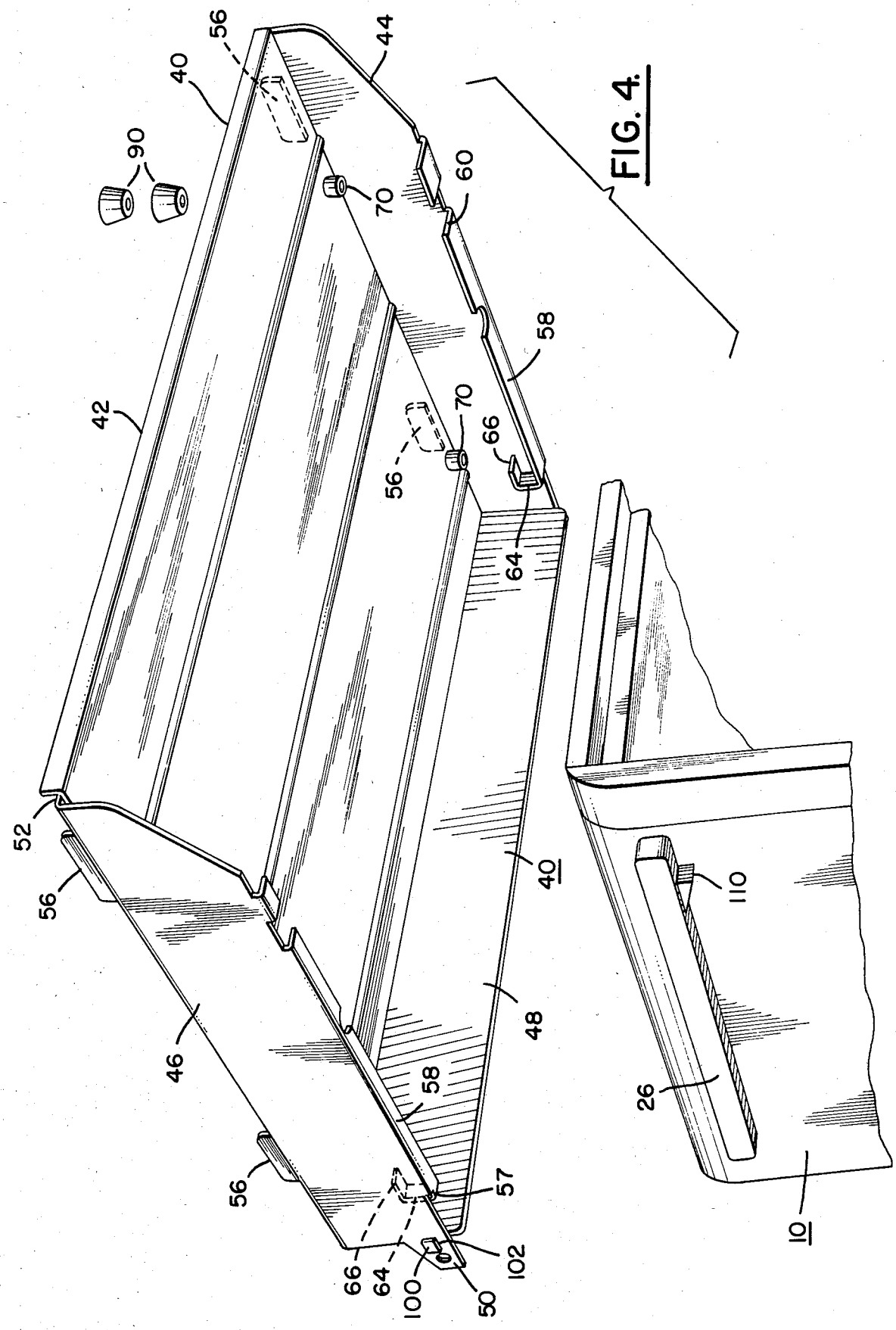
FIG. 4 is an exploded perspective view of our improved toaster oven and protective hood in order to show details of construction.

Also in accordance with our invention, as shown more particularly in FIG. 1, FIG. 3 and FIG. 4, it can be appreciated that the depending vertical side walls 44 and 46 of the hood extend downwardly and wrap around the handles 24 and 26 of the toaster oven so that very little, if any, hot air flows outwardly to the sides of the toaster oven and the hood where it could damage the wooden kitchen cabinet. Essentially, all of the air is vented forwardly and away from the kitchen cabinet.

PROTECTIVE MOUNTING HOOD CONSTRUCTION

In accordance with our invention, the protective mounting hood 40 is constructed of relatively few parts which may be readily connected to each other, and it is uniquely provided with stop and spacing projections so that it may be installed under a kitchen cabinet by a consumer to provide the cooling air protection illustrated in the diagramatic view of FIG. 3. As shown more particularly in FIG. 4, the hood includes a generally horizontal top wall 42 that may be constructed from one or more pieces of sheet metal. As illustrated, the rear portion of the top wall may be formed to provide a downwardly extending rear vertical wall 48 that is generally perpendicular to the top wall 42 and extends downwardly approximately two and one-half inches from the generally horizontal top wall 42. The vertical side walls 44 and 46 may be formed of separate pieces of sheet metal that can be readily riveted to the generally horizontal top wall 42.

With particular reference to FIG. 4. it can be appreciated that each of the vertical side walls 44 and 46 may be stamped from a generally flat piece of sheet metal to the shape generally shown. Thus, each of the sheet metal side plates 44 and 46 include a rearwardly extending spacer tab 50 for holding the generally vertical rear wall 48 of the hood approximately three-eights of an inch from a kitchen wall 27. The upper portions of each of the vertical side walls 44 are formed to include a generally horizontal flange 52 for connecting the vertical side walls to the generally horizontal wall 42 of the hood by means of rivets or other suitable connecting means. As illustrated, each of the generally horizontal flanges include a generally vertical spacer tab 56 that may be struck from the horizontal flanges of the vertical side walls 44 and 46. The tabs 56 are at least one-half inch high to insure that when the hood 40 is installed on a kitchen cabinet 25 by a consumer, it will be placed at least one-half inch below the lowermost portion of wooden surface of the kitchen cabinet.

The vertical side walls 44 and 46 are also uniquely shaped and constructed for cooperating with the generally horizontal handles 24 and 26 of the toaster oven so that the toaster oven may be readily suspended from the hood or taken off the hood without impairing the appearance of the toaster oven. In order to achieve this, each of the vertical side walls of the hood is shaped to include an inwardly extending lower flange 58. Each of the flanges 58 are stamped to include a slot or aperture 60 for receiving a locking tab 110 of a toaster oven handle to be described more particularly hereinafter.

As shown more particularly in FIG. 4, slots 57 are formed between the inwardly directed horizontal guide flanges 58 and the vertical walls 44 and 46 of the hood so that the rear portions of the inwardly extending flanges 58 may be shaped to include stops 64 for the rear portions of the toaster oven handles 24 and 26 in order to insure that the rear wall 7 of the toaster oven is positioned at least one-half inch forwardly from the rear wall 48 of the hood. To achieve this, after the slots 57 have been formed, the rear portions of the inwardly extending flanges 58 are shaped to include a generally vertical rear stop portion 64 and a generally horizontal stop portion 66 for semi-circling the rear extremities of each of the handles 24 and 26 of the toaster oven.

In order to connect the hood to the underside of a kitchen cabinet, as shown more particularly in FIG. 3, threaded nuts 70 may be riveted or trapped between the flanges 52 of the vertical side walls 44 and 46 and the upper surface of the generally horizontal wall 42 for cooperating with screws 80, washers 84 and a plurality of plastic spacers 90. As shown in FIG. 4, the vertical walls 44 and 46 of the hood may be readily connected to the depending rear wall 48 of the hood by means of tab 100 that may be provided on the rear wall of the hood for cooperating with a slot 102 that is formed in each of the depending vertical side walls 44 and 46. In a conventional manner, the tab 100 may be bent over for securing the walls to each other.

TOASTER OVEN CONSTRUCTION

As shown in FIG. 1 and FIG. 2, the toaster oven for cooperating with our unique protective mounting hood 40 may be formed of two plastic side panels 8 and 10. Each of the side panels preferably include feet 18 for supporting the toaster oven in a conventional manner on a counter top 23 and our unique integrally formed generally horizontal outwardly extending handles 24 and 26. As shown more particularly in FIG. 3, each of the handles 24 and 26 extend along a substantial width of the toaster oven and are spaced downwardly from the top wall of the toaster oven a distance that is approximately one-half inch less than the distance from the inwardly extending flanges 58 of the vertical side walls of the hood to the top wall 42 of the hood. By this arrangement, the top wall 6 of the toaster oven is positioned at least one-half inch below the top wall 42 of the hood.

In accordance with our invention, each of the generally horizontal handles 24 and 26 also include an integrally formed downwardly extending triangular projection 110 for cooperating with each of the slots or apertures 60 that are formed in the inwardly directed guiding flanges 58 for holding the toaster oven in spaced relation to the supporting hood.

INSTALLATION

With this unique arrangement of parts, it can be appreciated that our improved electric toaster oven may be selectively suspended from a kitchen cabinet or used as a conventional toaster oven that is supported on the counter by feet that are provided on the toaster oven. In order to suspend the toaster oven from the hood 40, it is merely necessary to grip the toaster oven by the handles 24 and 26, position the rear portion of the handles on the front portions of the inwardly directed flanges 58 and slide the toaster oven and the handles 24 and 26 rearwardly until the rear portion of the handles 24 and 26 abut the upwardly extending flanges 64. At this time, the locking triangular projections 110 of the handles will be in line with the apertures 60 of the inwardly directed flanges 58 and the locking projections 110 will fall within the apertures 60 to hold the toaster oven in supported relation on the hood 40. Conversely in order to remove the toaster oven from the hood, it is merely necessary to lift the bottom portion of the toaster oven so that the locking tabs 110 move above the inwardly directed flanges of the hood and then slide the toaster oven on its handles out of the hood. Then the toaster oven may be conventionally supported on a counter top by means of the feet 18 and operated in a conventional manner. In addition, the toaster oven may be easily cleaned while it is on the kitchen counter.

In accordance with our invention, it can be appreciated that the hood 40 may be readily suspended from a lower wall 25 of a cabinet with the use of a minimum number of tools. Moreover, the tabs 50 and 56 that are provided on the hood 40 insure that the hood will be spaced a minimum distance from the wooden kitchen cabinet 25 and the wall of the kitchen. Thus, the hood 40 effectively protects the wooden kitchen cabinet from heat, steam and flames that could come from the toaster oven.

What we claim is:

1. An electric toaster oven and a protective hood for installing an electric toaster oven under a kitchen cabinet comprising;
   a. an electric toaster oven including a generally horizontal top wall, generally vertical side walls, a generally vertical rear wall and a front opening to provide access to the inside of the toaster oven;
   b. each of said side walls including an outwardly extending generally horizontal handle projection;
   c. a protective hood for mounting the toaster oven including a top generally horizontal wall, an integrally formed depending rear wall, and downwardly extending vertical side walls;
   d. means for securing the hood;
   e. means for spacing the hood to provide cooling air flow over the top of the hood;
   f. an inwardly extending flange formed on each of the vertical side walls of said hood for slidable engagement with the horizontal handle projections of said toaster oven;
   g. means formed on each of said handle projections of the toaster oven for cooperating with means formed on each of said inwardly extending flanges of said hood for spacing the rear wall of the toaster oven at least one-half inch from the rear wall of the hood and for spacing the top of the toaster oven at least onehalf inch from the top wall of the protective hood to provide cooling air flow upwardly between the rear wall of the hood and the rear wall of the toaster oven and then forwardly between the top wall of the hood and the top wall of the toaster oven where it can be vented in front of the hood.

2. An electric toaster oven and protective hood as defined in claim 1 wherein the downwardly extending side walls of the hood are securely attached to the rear wall and extend forwardly beyond the vertical side walls of the toaster oven to thereby cause any escaping heat or smoke from the sides and corners of the toaster oven to flow forwardly whereby the air between the toaster oven and the hood is heated as it draws heat away from the toaster oven, and cooler air flows above the wood to keep the heated air away from the kitchen cabinet.

3. An electric toaster oven and a protective hood for installing an electric toaster oven under a kitchen cabinet comprising:
   a. an electric toaster oven including a generally horizontal top wall, generally vertical side walls, a generally vertical rear wall and a front opening to provide access to the inside of the toaster oven;
   b. each of said side walls including an outwardly extending generally horizontal handle projection;
   c. a protective hood for mounting the toaster oven including a top generally horizontal wall, an integrally formed depending rear wall, and downwardly extending vertical side walls;
   d. means attached to the top wall of the hood for securing the hood;
   e. means for spacing the hood to provide cooling air flow over the top of the hood;
   f. an inwardly extending flange formed on each of the vertical side walls of said hood for slidable engagement with the horizontal handle projections of said toaster oven;
   g. means formed on each of said handle projections of the toaster oven for cooperating with means formed on each of said inwardly extending flanges of said hood for spacing the rear wall of the toaster oven from the rear wall of the hood and for spacing the top wall of the toaster oven from the top wall of the protective hood to provide cooling air flow upwardly between the rear wall of the hood and the rear wall of the toaster oven and then forwardly between the top wall of the hood and the top wall of the toaster oven where it can be vented in front of the hood;
   h. a downwardly extending locking projection integrally formed and forwardly located on each of said toaster oven handle projections; and
   i. the front portions of each of said inwardly extending flanges being formed to define an aperture of sufficient size for receiving the locking projections on said handles for holding the toaster oven in spaced relation to said supporting hood.

4. An electric toaster oven and a protective hood for installing an electric toaster oven under a kitchen cabinet comprising:
   a. an electric toaster oven including a generally horizontal top wall, generally vertical side walls, a generally vertical rear wall and a front opening to provide access to the inside of the toaster oven;
   b. each of said side walls including an integrally molded plastic shell having an outwardly extending generally horizontal handle projection upwardly located on each of said side walls;
   c. rearwardly extending projections integrally formed on each of said plastic side shells for spacing said toaster oven to provide cooling air flow upwardly over the generally vertical rear wall;
   d. a protective hood for mounting the toaster oven including a generally horizontal sheet metal wall, an integrally formed depending rear wall, and downwardly extending vertical side walls;
   e. upwardly extending flanges integrally formed on each of the vertical side walls of the hood for spacing the hood to provide cooling air flow over the top of the hood;
   f. means connected to the horizontal wall of the hood for securing the hood under a kitchen cabinet;
   g. an inwardly extending flange formed at the bottom of each of the vertical side walls of said hood for slidable engagement with the horizontal handle projections of said toaster oven;
   h. each of said inwardly extending flanges including a front portion, a central portion and a rear portion;
   i. a downwardly extending locking projection integrally formed and forwardly located on each of said toaster oven handle projections;
   j. the front portions of each of said inwardly extending flanges being formed to define an aperture of sufficient size for receiving the locking projections of said handles for holding the toaster oven in spaced relation to said supporting hood;

k. the rear portions of each of said inwardly extending flanges being formed to include an upwardly extending and a forwardly extending stop for slidable and stopping engagement with the rear of the handle projections so that said toaster oven may be lifted and slid into position on said hood with the projecting handles sliding on the inwardly extending flanges until the rear of the handles abut the stops and the locking projections fall into the apertures thereby locking the toaster oven in position on the hood.

5. An electric toaster oven and protective hood as defined in claim 4 wherein air vents are provided in the rear wall of the toaster oven and the depending rear wall of the hood extends downwardly at least two and one-half inches and beyond the air vents in the rear wall of the toaster oven the downwardly extending vertical side walls extend downwardly at least two and one-half inches and the inwardly extending flanges formed at the bottom of the vertical side walls extend inwardly at least one-quarter inch, and wherein the rear portions of each of the inwardly extending flanges form a stop for the handles of the toaster oven so that the rear wall of the toaster oven is spaced at least one-half inch forwardly of the downwardly extending rear wall of the hood for venting rear heat upwardly between the rear wall of the hood and the rear wall of the toaster oven, then forwardly between the horizontal top wall of the toaster oven and the horizontal wall of the hood and then forwardly below the horizontal wall of the hood beyond the outer extremity of the kitchen cabinet to thereby provide air flow and separate the hot surfaces of the oven toaster from the cabinet.

6. An electric toaster oven and a protective hood for installing an electric toaster oven under a kitchen cabinet comprising:

a. an electric toaster oven including a generally horizontal top wall, generally vertical side walls, a generally vertical rear wall and a front opening to provide access to the inside of the toaster oven;

b. each of said side walls including an integrally molded plastic shell having an outwardly extending generally horizontal handle projection upwardly located on each of said side walls;

c. a protective hood for mounting the toaster oven including a generally horizontal sheet metal wall, an integrally formed depending rear wall, and downwardly extending vertical side walls;

d. upwardly extending flanges integrally formed on each of the vertical side walls of the hood for spacing the hood to provide cooling air flow over the top of the hood;

e. means connected to the horizontal wall of the hood for securing the hood under a kitchen cabinet, said means including a plurality of spacers for spacing the hood a distance below the kitchen cabinet;

f. rearwardly extending flanges integrally formed at the lower rear of each of the vertical side walls of the hood for spacing the hood forwardly;

g. an inwardly extending flange formed at the bottom of each of the vertical side walls of said hood for slidable engagement with the horizontal handle projections of said toaster oven;

h. each of said inwardly extending flanges including a front portion, a central portion and a rear portion;

i. a downwardly extending locking projection integrally formed and forwardly located on each of said toaster oven handle projections;

j. the front portions of each of said inwardly extending flanges being formed to define an aperture of sufficient size for receiving the locking projections on said handles for holding the toaster oven in spaced relation to said supporting hood;

k. the rear portions of each of said inwardly extending flanges being formed to include an upwardly extending and a forwardly extending stop for slidable and stopping engagement with the rear of the handle projections so that said toaster oven may be lifted and slid into position on said hood with the projecting handles sliding on the inwardly extending flanges until the rear of the handles abut the stops and the locking projections fall into the apertures thereby locking the toaster oven in position on the hood.

7. An electric toaster oven and protective hood as defined in claim 6 wherein the upwardly extending flanges formed on each of the vertical side walls of the hood extend upwardly at least one-half inch above the generally horizontal sheet metal wall of the hood so that there is at least one-half inch of air space between the top horizontal wall of the hood and the lower most portion of a kitchen cabinet, and wherein the plurality of spacers for connecting the horizontal wall of the hood under a kitchen cabinet are at least one inch high for spacing the horizontal wall of the hood at least one inch below the major portion of the kitchen cabinet, and wherein the rearwardly extending flanges inwardly formed at the lower rear of each of the vertical side walls extend at least one-half inch rearwardly for spacing the hood forwardly away from any wall below the kitchen cabinet so that air may flow upwardly behind the rear wall of the toaster oven upwardly behind the rear wall of the hood, forwardly above the horizontal wall of the hood and out through at least one-half inch air gap between the horizontal wall of the hood and the lowermost surface of the kitchen cabinet and then upward along the face of the cabinet forming a cooler air shield against the hotter air that flows upwardly from between the bottom of the hood and the top of the toaster oven.

* * * * *